Figure 4:
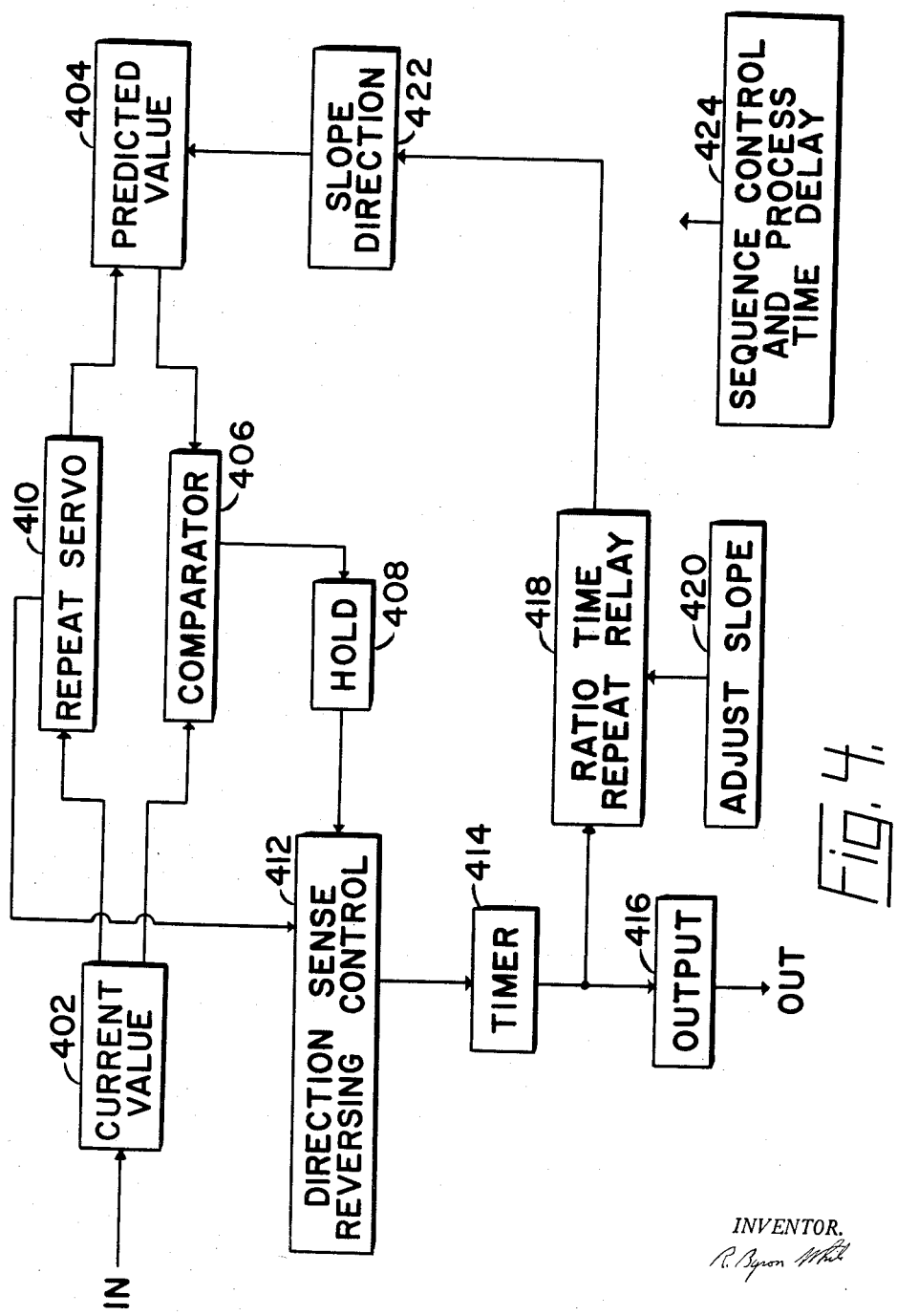

Feb. 21, 1961 R. B. WHITE 2,972,446
OPTIMAL CONTROLLER
Filed April 30, 1956 4 Sheets-Sheet 1
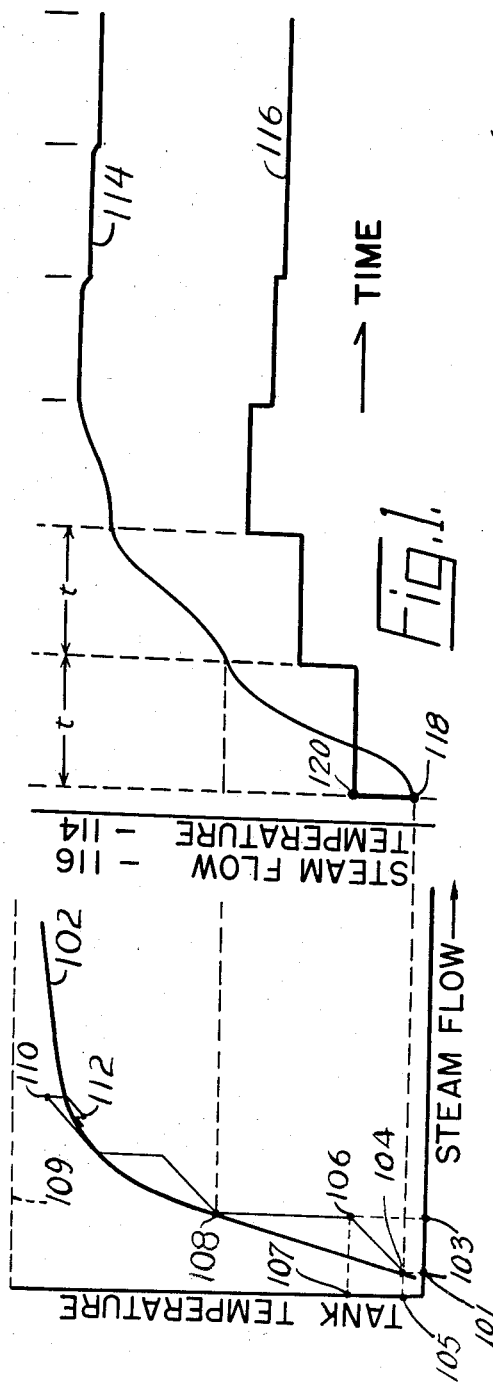
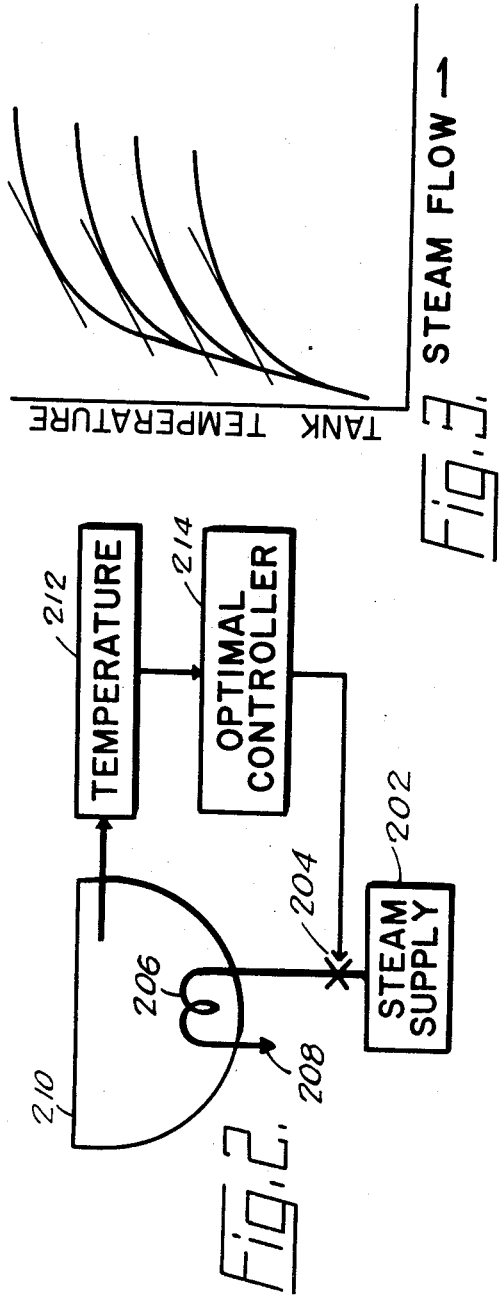
INVENTOR.
R. Byron White INVENTOR.
R. Byron White Feb. 21, 1961

R. B. WHITE 2,972,446

OPTIMAL CONTROLLER

Filed April 30, 1956

4 Sheets-Sheet 4

INVENTOR.
R. Byron White

United States Patent Office 2,972,446
Patented Feb. 21, 1961

2,972,446

OPTIMAL CONTROLLER

Roby Byron White, 381 N. Main St., Sharon, Mass.

Filed Apr. 30, 1956, Ser. No. 581,566

16 Claims. (Cl. 236—46)

The present invention relates to controllers and control methods and in particular to non-linear controllers capable of finding and maintaining optimal conditions in a complex system or process.

The current state of the art is summarized by the following quote from Patent Number 2,628,606, Control System, by Draper and Li: ". . . the present invention contemplates control means for measuring an output quantity to be optimalized, and searching or hunting devices for effecting continuius variations in the input and for maintaining the input at or near such values that the maximum . . . output value is attained."

The controller of this invention will perform, but is not limited to the essential control problem of the preceding paragraph. There are large groups of functions, square-law and logarithmic for example, which do not have a maximum or a minimum but which do have areas of rapidly changing slope and therefore may have need of for what will be termed herein, optimal control.

As used here, the words maximizing and minimizing infer control at the point of zero slope on the operational curve of a system or process: optimal control infers control at a point on an operational curve where the slope is other than zero. For both maximum control and optimal control, the control parameter is the slope of the process curve and not a fixed point on that curve.

To clarify the type of problem involved, the following examples are given:

*Maximizing or zero slope control.*—A train travelling a straight, level track and with no wind will average some number of miles per gallon of fuel depending on the speed, and consequently, the throttle setting. It is apparent that the curve of miles per gallon versus throttle setting has a maximum since it goes to zero with a closed throttle, and, at the other end, falls rapidly because of air resistance at high speeds. The problem is to control the throttle such as to make the whole train operate at the maximum miles per gallon. The input quantity or variable of the system to be controlled is the throttle setting. The output quantity or variable of the system, which is to be maximized, is a ratio of two other variables, miles per hour and gallons per hour, both of which can be readily measured.

Note that in the example above, the system output was a ratio of two variables which gave the desired "maximum miles per gallon." It is characteristic of this type of control that either the output or the input or both may be ratios of two variables, or the controlled input variable may be part of a ratio in the output.

The same principles can be applied to ships or aircraft. Other examples of applications are obtaining maximum product in a continuous chemical process and minimizing fuel cost in a constant temperature furnace by controlling fuel-air ratio.

*Optimal control on slopes other than zero.*—A process tank is to be heated from a steam line under conditions where the steam supply temperature is neither constant nor consistent. The curve of tank temperature versus steam usage rises rapidly as steam is added until the tank temperature begins to approach the steam temperature. At this point the rate-of-rise drops sharply and the curve approaches the team temperature asymptotically. The last few degrees of rise are very expensive in terms of steam used. If it is economically justifiable to heat the tank at all then there is some balance or optimal point where the steam usage cost equals the value of heat in the process tank; this point can be represented by a slope on the curve. The controller which is the subject of this invention will maintain control on this slope of the characteristic curve of the process so as to obtain the optimal tank temperature, and thus the best cost balance, even though the steam temperature changes over a wide range.

Other examples where the control parameter is slope or rate-of-change of the system output quantity with respect to its input quantity are the efficiency of fractionating towers as a function of the cost of the heat input, and the absorption of oxygen in the blood stream as a function of concentration of oxygen in an oxygen tent.

Several control methods for accomplishing part or all of the above results have been described by Draper and Li, U.S. Patent Number 2,628,606, dated Feb. 17, 1953, and in my own copending applications for Optimizing Timer, Serial Number 525,599, dated Aug. 1, 1955, and Rate of Change Controller, Serial Number 535,495, dated Sept. 20, 1955. Both mentioned applications are now abandoned. All of these control systems have one thing in common, they work on an after-the-fact principle. The control action is such that the system being controlled is swept or jogged through the maximum point until the droop of the curve is sufficiently below the maximum to give rise to a reversal in the control signal. These controllers make their action as a result of the recent control history of the system.

The optimal controller, which is the subject of the present invention, operates on a before-the-fact principle. It simultaneously makes a change in the input of the controlled system or process and predicts what the result of that change will be in the output of the system or process. If the result of the change is the same as that predicted, the controller holds that condition until some external influence changes the optimal point. If the result of the change is not the same as that predicted, the controller makes another change in the input condition. The amount and direction of this change is based only upon the information of the difference and direction between the predicted value of the system output and that which occurs. The optimal controller of this invention makes its action as a result of the way a controlled system or process actually reacts to a change in the input control parameter in relation to what it would be if the system or process were operating at the desired control slope.

An object of this invention is to provide a non-linear controller for systems or processes which is capable of controlling on the maximum, minimum and optimum characteristics as described above.

Another object of this invention is to provide a controller of the class described which will cause the controlled process to approach and hold the optimal condition point in a manner such as not to cause upset of delicate processes. This is accomplished by providing adjustments on the controller which are set to match the characteristics of the process such as response time between input and output and the steepness of slope of the typical process control curve.

Another object of this invention is to provide a non-linear type controller which will maintain optimal cost conditions in a system or process even though other unpredictable and uncontrollable conditions or factors may be acting simultaneously.

Figure 5:
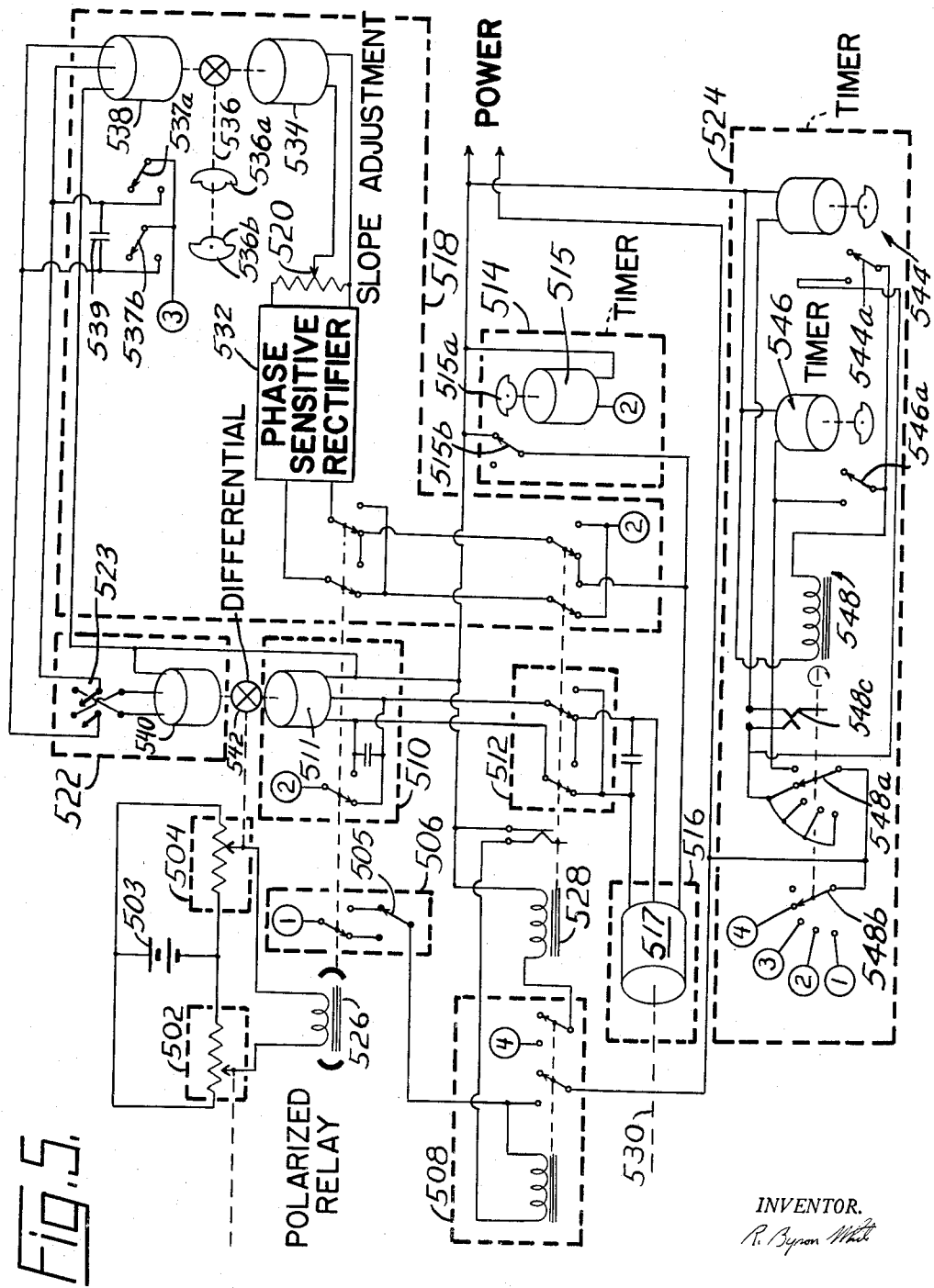
Figure 6:
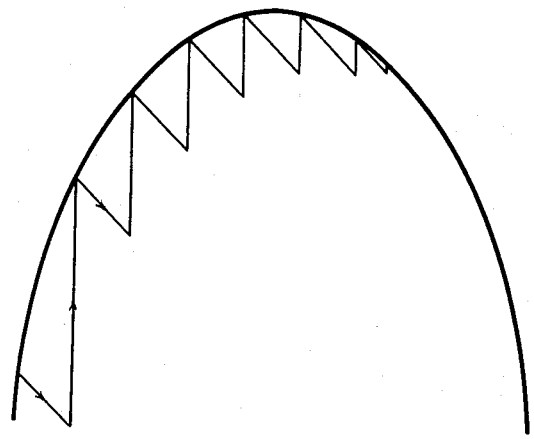
Figure 7:
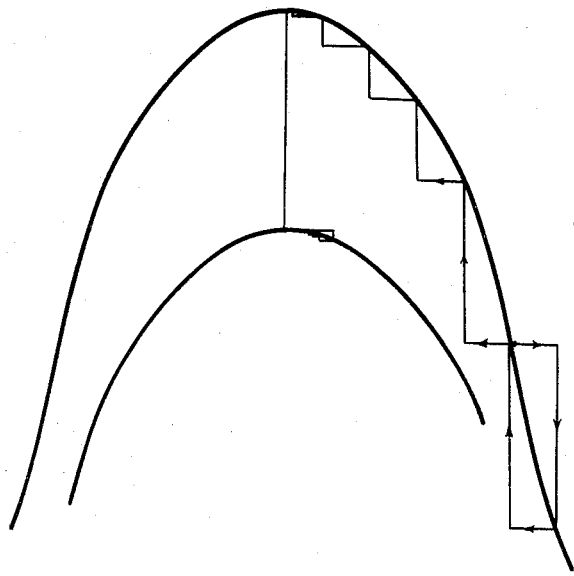

Further objects and advantages of this invention, as well as its arrangement, construction and operation, will be apparent from the following description and claims in connection with the accompanying drawings, in which:

Fig. 1 is a graphical representation of the operation of the optimal controller on a logarithmic process curve, such curve being representative of the type found, for example, in the heating of process tanks, Fig. 2 indicates a simple application of the optimal controller to the heating of a process tank, Fig. 3 shows typical operational curves for the application of Fig. 2, Fig. 4 is a block diagram of the preferred form of the optimal controller of this invention, Fig. 5 is a circuit diagram of the block diagram of Fig. 4, Fig. 6 indicates the method by which this controller approaches a non-zero slope point on a maximum type curve, and, Fig. 7 indicates the method by which this controller approaches the maximum of a maximum type curve.

The invention will first be described in terms of its operation in controlling the heating of a process tank, or more specifically control on a slope of a logarithmic process curve. Operational requirements and refinements will be defined as needed.

First consider Fig. 2. A steam supply 202 is supplying heat in order to increase the operating temperature of a process tank 210. This tank may, for example, be a cooking kettle for making chocolate. Heat, in the form of steam flow, is regulated by valve 204, and then fed into the heating coil 206 inside the tank. The steam, at a reduced temperature, exists as indicated at 208. The general shape of the process curve can be determined intuitively and is graphically represented by curve 102 of Fig. 1. Referring further to Fig. 2, the reader will note that an instrument as indicated at 212 continuously measures the temperature of the process and provides this information as the input to the optimal controller 214. The output of the optimal controller 214 is the adjustment of the throttling action of the steam valve.

From theoretical considerations it is known that the process curve has a "knee" or area of rapid change in slope. It is probable that some point on the "knee" of the curve is the most economical operating point since at lesser steam flow rates a large temperature rise is obtained for a unit change in steam flow; and at steam flows above the "knee" of the curve very little increase in temperature of the process tank is obtained for large changes in steam flow. For purposes of this example, let it be required that operation of the system is to be set at a slope on the "knee" of the process curve.

The function of the optimal controller of this invention is such that it actually has control of the basic variable of the process, in this example, steam flow. It is a non-linear, logical type controller in that it performs its function by making an arbitrary change in the steam flow to the process and basing further control action on the manner in which the process reacted to this arbitrary change. This sequence is repeated over and over until the process is operating as required.

In Fig. 1, assume that the actual process curve 102 has been plotted by making step variations in the steam flow and plotting the resulting tank temperature. The steam temperature, plotted against the tank temperature scale is represented by the line 109. The process curve 102 asymptotically approaches this line since the tank temperature can never get higher than the steam temperature, no matter how high the steam flow rate. Assume also the desired slope has been determined and set into the controller. The manner in which this is done will be described later. The actual functioning of the optimal controller of this invention will be described by tracing its control action step by step on this process curve.

Assume that at the start of the control action the input and output conditions of the controller, that is tank temperature and valve position to give a steam flow, are as indicated at point 104 with tank temperature 105 and steam flow 101. Assume also that the process has an inherent time delay "t" between changing the steam flow and obtaining the full result of that change as a new tank temperature. The steps to be followed in the first part of the control action are:

(1) Make a unit change in the steam flow from flow 101 to flow 103. On curve 116 representing a plot of steam flow versus time, this change is represented by the step change from point 118 to point 120.

(2) Based on the known tank temperature 105, the known change in steam flow made in step 1 above, and the desired slope, predict what the new tank temperature should be after "t," "if the process is actually operating at the desired slope on the process curve." This may be expressed mathematically as:

(Predicted tank temperature)=(current tank temperature)+(slope)×(change in steam flow)

In this formula, the slope is the predetermined and manually preset condition just as temperature or pressure would be in a conventional controller. The slope is set by a manually adjustable control. Since the controller has made the change in steam flow, it can compute the last term in the formula. The controller adds the computed value to its own input i.e., the current tank temperature, to obtain the predicted condition for the process after the process has had a change to stabilize from the change in its input which has just been made. This predicted condition for the tank temperature is stored by the controller for comparison with the stabilized tank temperature after time "t," the stabilization time of the system. The controller then uses the stabilized tank temperature to recompute a new predicted condition for use after the next time "t"; it thus chases itself along the process curve. The predicted process condition is shown at point 106 with predicted tank temperature 107.

(3) Base further control action on the difference between the predicted tank temperature and the actual tank temperature as measured after time "t"; i.e., after stabilization of the system. This difference between the temperatures is used by the controller of this invention in a similar manner to the way a conventional follow-up servo system uses an "error signal"; the absolute value of the temperature difference controls the amount of change made in the process in the next cycle (the larger the difference, the larger the change). Similarly, with a servo, a large error signal calls for the highest driving force. The polarity or direction of difference between the actual and predicted temperature controls the direction of the next change, but because this is a non-linear control with a logic function, it is not comparable to the servo error signal counterpart.

With respect to step 1 above, there are many process applications for this type of control wherein it is desirable not to upset the process by large changes of the input variable. Thus, for process stability generally, there is a maximum unit change by the controller of the system input, for each operational cycle. For example, to make possible the convergence of the control characteristic of the system to the preselected slope on the process curve as illustrated in Fig. 1, it will become apparent that the change in steam flow should be proportional to the difference between the tank temperature value predicted in step 2 above and the actual tank temperature value of the stabilized system output, so long as this change is less than a predetermined maximum unit change allowed. Effectively, this is an anti-hunting requirement in that convergence to a stable situation is not possible without it. It should be noted, however, that this maximum change limitation is not analogous to the maximum drive signal on a servo follow-up system; it is more analogous to the criteria establishing maximum rate-of-change in such a servo system. The requirement for process stabilization before recycling, i.e. the time "*t*" above, is also a part of the anti-hunting requirement in that if the stabilization is not complete, a part of the change remains for the next cycle and the predicted tank temperature can never equal the stabilized temperature. On the other hand, where the two anti-hunt requirements have been properly met, the difference between the predicted and actual stabilized temperatures approaches zero as the required control point is approached, and when the difference between the actual and predicted temperatures for a given cycle is zero, the "error signal" disappears and the process is stabilized.

Note that the method used in this invention to control on the slope of the process curve has many similarities to the methods used in differential calculus to find the slope of a curve. In the calculus, a small arbitrary change is made in one of the parameters of the curve, say delta X; the resulting amount of change in Y, delta Y, is then divided by delta X to determine the slope, there is no indication of absolute value of either X or Y. A similar procedure is followed in the practice of my invention but the control parameter is the slope and the requirement is to find a point on the process curve which has that slope. As with the calculus, a change is made in X, delta X; this is multiplied by the slope to obtain a predicted delta Y; the controller changes the value of X until the actual delta Y equals the predicted delta Y. It does this by adding the predicted delta Y to the current value of the process output to obtain a predicted value of the process output; it then compares this predicted value to the actual stabilized value of the process output which is, in reality, the last current value plus the actual delta Y.

Referring further to Fig. 1, the reader will recall that a unit change was made in steam flow and the controller predicted that the new system operating point would be at point 106. However, after time "*t*," the system actually stabilized on the process curve at point 108. In accordance with step 3 above, the controller must recognize that the change in steam flow was in the proper direction, and since there existed a large difference between the predicted and actual values of the tank temperature, another maximum unit increase of steam flow must be made.

The cycle is repeated a total of three times with the third change in steam flow giving the predicted tank temperature shown at point 110. At this point the tank temperature stabilizes at a point lower than that predicted. Since an increase in steam flow was provided when the actual temperature was greater than the predicted tank temperature, then for an actual temperature less than the predicted temperature, a necessary decrease in steam flow is indicated. Also, the difference between actual and predicted values is comparatively small so a lesser change in steam flow is indicated. Thus, the controller changes the steam supply valve position and predicts a new value for tank temperature which establish a new predicted condition as indicated at point 112. From the above the reader will recognize that the predicted value is in fact a calculated reference point for the system output.

Since the direction of control is reversed, starting at point 110, it is necessary to establish the requisite for further control action. This may be stated as follows: when controlling at or near an apparent maximum, if the actual current value is less than the predicted value then the sense of direction control mentioned above must be reversed after the completion of the cycle in process. Conversely, at or near an apparent minimum, the sense of direction control must be reversed after a cycle in which the actual current value is greater than the predicted value. If this rule is followed the controller will converge the steam flow rate to such a value that the operating point on the process curve is tangent to the slope value originally set into the controller.

The term "at or near an apparent maximum" is herein used to indicate that the control slope may be zero at the maximum of a curve or may not be zero but be in a region of the curve where it is relatively high in value of the ordinate quantity and if the ordinate decreased with increasing abscissa there would be a maximum. Thus the problem of the heated process tank was an "apparent maximum." The converse defines the expression "at or near an apparent minimum."

The curve of tank temperature with time is indicated at 114. The curve of total steam flow with time is indicated at 116. It is apparent that there is some lesser value of maximum incremental input change which will allow convergence to the control point without overshoot. It is noted that if the stabilization time delay "*t*" is set for too short a time, there may be a carry-over of output change which will upset the proportional nature of the input changes near the control point.

The operation curve for the process of Fig. 2 is shown in Fig. 3. The family of curves represent the effect of various steam temperatures. At any given time only one of the family of curves is applicable. However the controller must shift from one to another of them as the steam temperature changes. The control slope, and thus the control point is indicated for each curve. This slope can be adjusted to the economic balance between cost of steam and value of heat when available in the process tank. This economic balance will then be held independent of steam temperature.

For the case of the maximizing problem involving the train, referred to in the introduction, the input to the controller would be an analog of the ratio, miles per gallon of fuel; the output of the controller would physically set the throttle so as to obtain the maximum miles per gallon.

From the above description, the operational requirements for a generalized controller of this class can be set forth so that the controller itself can be described. These requirements are as follows:

(*a*) The controller must provide an output signal which is physically capable of making an incremental change in a mechanical system.

(*b*) The incremental change provided in (*a*) must be proportional to the difference between the actual current and previously predicted values of the controller input variable up to some adjustable maximum value.

(*c*) The sense of control direction i.e. increasing or decreasing system input is maintained except that it must be reversed under the conditions as stated in the requisite above. Because the reversing is done after the cycle is complete it implies that there must be a memory device to "hold" the reversing signal.

(*d*) Since the controller must predict a new value for the uncontrolled variable and retain that value over the time delay "*t*," it must be a form of an elementary computer with limited storage facility.

(*e*) It must have adjustments for:

(1) Desired slope of the process curve,
(2) Slope direction or maximum or minimum,
(3) Process stabilization time "*t*," and
(4) Maximum output increment.

(*f*) It must be self controlling in its sequence of events so that calculations and reversing take place in the right order.

(*g*) It must continuously repeat the cycle.

With these seven basic functions as requirements, it is possible to construct a block diagram and then mechanize a suitable controller for problems of this general class.

Fig. 4 is a block diagram of the optimal controller which is the subject of this invention. The input to the controller is the current value 402; this is preferably in analog form either as a shaft rotation or as a voltage. In the problem of the process tank above, the input to the controller is the temperature of the process tank. This is compared to the predicted value 404 by the comparator 406 and depending on the relationship between these values and the instructions given to the controller as to type of curve and slope, it may, or may not store a change signal at hold 408. Hold 408 may be considered as a bistable static memory circuit. This circuit fulfills the requirements as set forth in requirement (c) above.

The repeat servo 410 then brings the predicted value analog 404 to the same value as the current value 402 as a starting point for a new predicted value. At the same time the circuits of the repeat servo 410 give a signal for driving the output 416 through the direction sense reversing control 412 and the timer 414. The output thus has direction sense with respect to the difference in current and predicted value and is also proportional to this difference in magnitude except that it may be shortened by the timer 414. This output controls, and makes incremental changes in the position of valve 204 in Fig. 2, for example.

Simultaneously with the output change the ratio-time-repeat relay 418 is activated. The function of this unit is to compute and store for later use a signal which has the same direction sense as the output and whose magnitude is adjustable as a percentage of the output. For purposes of illustration the chosen base-line is time. Thus the output can be the amount of time for a constant speed motor to rotate a shaft through a given angle. The adjustable magnitude of the rotation then becomes the slope control 420, and the shaft angle is proportional to the product of the desired rate-of-change of the controller input with respect to the output and the output change or in physical terms the expected incremental input difference. In the problem of the process tank, this unit multiplies the desired slope times the incremental change in output. For maximum and minimum problems, this expected incremental input difference is always zero because the slope is zero.

The third step in the cycle is to predict the new value to be obtained. The predicted value analog 404 has already been set to the current value as a starting point. The relative change to be expected because of the change in output has been computed and stored at the ratio-time-repeat relay 418. The direction of the slope, whether positive or negative with respect to the output is preset at the slope direction control 422. This is a manual switch whose setting is determined by the mathematical positive or negative sign of the slope on which control is desired. The expected incremental input difference because of the controller output change is then applied to the stored current value to obtain the new predicted value 404. Final direction sense is set by slope direction control 422. This predicted value then becomes the reference point for controller action of the next cycle.

The reader will now appreciate that the predicted value 404 is first brought to an analog of the tank temperature 105 and the desired slope is physically set into the adjust slope control 420. The ratio-time-repeat relay 418 multiplies the desired slope times the output giving an increment equal to the difference between temperatures 107 and 105. This expected incremental difference is added to the tank temperature 105 in a direction, positive or negative, determined by slope direction control 422 and thus a new predicted temperature equal to temperature 107 is carried as an analog at predicted value 404.

It remains to apply any reversing signal held at hold 408 to the direction sense reversing control 412. This completes the requirements of the controller cycle. The sequence controller and process time delay 424 maintains the order of operations as given above and starts the next controller cycle after there has been sufficient time lapse for the process to stabilize to its new value following the maximum incremental change.

Fig. 5 is a circuit diagram showing one form of mechanization of the block diagram of Fig. 4. Various groups of components are outlined in dashed lines and identified by function number to correspond with Fig. 4. Thus block 502 is the current value here represented by a shaft rotation on a potentiometer and therefore an analog voltage. Block 504 is the predicted value, also an analog presentation on a potentiometer. These two voltages go to the coil of polarized relay 526 which has contact banks in block 506, the comparator, block 510, the repeat servo, and block 518, the ratio-time-repeat relay. Block 508 is the hold circuit which controls relay coil 528. This relay is a latching type with interrupter contacts similar to the type OCS relays made by Automatic Electric Company of Chicago, Illinois. It has contact banks in block 512, the direction sense reversing control, and block 518, the ratio time repeat relay. Potentiometer 520 is the slope adjustment. Block 514 is the maximum output timer and block 516 is the output, here represented as a motor with mechanical output shaft 530 suitable for controlling an air regulator which in turn will control a pneumatic steam valve, or for direct control of throttle position. Block 524 is the sequence control and process time delay.

In the circuit diagram of Fig. 5 the sequencing circuits are indicated by numbers, like numbers being electrically connected together. The electrical connections are so indicated for clarity in that the additional lines for making these connections would only serve to confuse the diagram. The numbers also indicate the sequence of operations within the optimal controller. The process stabilization time delay "$t$" occurs between steps four and one.

The operation of the circuit of Fig. 5 will now be described in terms of the sequence of operation.

*Step 1.*—The input to the controller is applied as an analog shaft position on the potentiometer of box 502. The shaft position of the potentiometer of box 504 indicates the previously predicted value for the current cycle. Both potentiometers are excited by a common battery 503. Thus the polarized relay 526 will indicate the comparative values of actual and predicted input. In box 506, the lower switch 505 determines whether a maximum or minimum type process curve is involved. If the contacts of switch 505 and relay 526 form a continuous circuit it indicates a reversing signal is to be stored. Thus power applied from the sequence controller 524 will pick-up the hold relay of box 508 and its picked-up position will be maintained by its own contacts.

*Step 2.*—Three separate but related actions take place with power applied at step 2. These will be separately described.

*Step 2a.*—Power is applied to the motor 511 of the repeat servo box 510 through a set of contacts from relay 526. The motor drives through differential 542 to predicted value storage 504 in such a direction as to make the predicted value storage 504 equal to the current value storage 502. At the same time the directional power is applied to the output motor 517 in output box 516 through the direction sense reversing control 512 which contacts are a part of relay 528.

*Step 2b.*—Power is applied to the output maximum increment timer 514. Motor 515 drives automatic resetting cam 515a which after a predetermined time actuates switch 515b, thus breaking the power circuit to output motor 517 and from the ratio-time-repeat-relay generally designated as box 518.

*Step 2c.*—Power is applied during the period of the output increment to the ratio-time-repeat relay 518. The phase sense of this power is reversed by the contacts of relay 528 and also the contacts of relay 526. Thus the output D.C. voltage of the phase sensitive rectifier 532 has a polarity which may be reversed by either of the two just mentioned relays. The phase sensitive relay may be any of a number of standard circuits typical of which are those described under "Nonlinear Modulators," page 552, Terman, Radio Engineers' Handbook, first edition, 1943. The output voltage of the phase sensitive rectifier 532 is applied to the potentiometer 520 which potentiometer is the manual slope adjustment; if this potentiometer is set at the extreme lower end for zero voltage to motor 534, the controller will then act as a maximizing or minimizing device according to the setting of the selector switch 505 in the comparator box 506. Motor 534 is a D.C. motor with the characteristic that the total rotation of its output shaft is proportional to the voltage and time applied. Thus it acts as a multiplier for the voltage obtained by the positioning of potentiometer 520, the time of output timer 514 and the reversing action of relays 526 and 528. This rotation is applied through a differential to cam shaft 536, the rotation of which shaft is limited to 180°.

*Step 3.*—At this point power is applied as indicated at the circled number 3 in the ratio-time-repeat-relay box 518. If cam shaft 536 has rotated such that cam 536a has closed switch 537a, power will be applied simultaneously to motors 538 and 540. Both motors are of the reversible synchronous type, their direction being controlled by phase splitting capacitor 539. Their direction of rotation will be such as to return cam 536a to its normal condition and deactivate switch 537a. If cam 536b has actuated switch 537b because of the rotation of cam shaft 536, the motor direction would have been reversed. Thus, motor 540 driving through differential 542 to predicted value storage 504 has a total shaft rotation directly proportional to that placed on cam shaft 536 by motor 534. Therefore, the computation of the predicted value is completed by the addition of the predicted increment of slope times time of output to the current value already stored at predicted value storage box 504 in step 2a above. The position of the rotor on the potentiometer of predicted value storage 504 is now set at the expected current value for the next cycle. Switch 523 is normally preset according to whether the desired slope is positive or negative.

*Step 4.*—If a signal was stored at the hold box 508 in step 1, it is now used to actuate relay 528 such operation breaking the hold voltage on the relay of box 508.

The sequence control and process time delay box 524 performs the necessary control functions to properly sequence the four steps just described and also will allow time for the process to stabilize. Two motor driven timers including cams and switches of the same type and action of that previously described in box 514 are generally indicated at 544 and 546. Relay 548 is of the Strowger type stepping switch with five cycle positions repeating over and over. In the fifth position switch 548a provides power from the power line to timer 546; this is the timer for process stabilization time. At the end of the timed period it makes contact at switch 546a which provides an impulse of power to the switch 548 and advances it to step 1. On steps 1–4 switch 548a provides power to the timer 544. The timed impulses from timer 544 may typically be 10 seconds apart; thus after 10 seconds the switch 548 will be actuated to step 2, etc. The switch 548b programs the successive steps in the computation and control as previously described by successively applying power from the power line to each of the circuits in the order as numbered. As previously mentioned, the circled numbers not only indicate the step but like numbers are also connected together electrically.

It is now possible to tie the steps taken by the controller of Fig. 5 to the curve at the left of Fig. 1. The input to the controller is tank temperature. Thus the temperature indicated at 105 is changed to an analog shaft rotation by conventional means and applied to the controller as a setting on the potentiometer of box 502. Since control action is just starting, the potentiometer of box 504 may be set at any value. Following the requirements of step 1 above, relay 526 will be actuated and since we are controlling toward an apparent maximum, the switch 505 is set in the maximum condition; at step 1, if it is indicated, a reversing signal will be stored. (In the problem of the curve of Fig. 1 a reversing signal will be stored on the third cycle.)

At step 2a, the predicted value storage 504 is made equal to the current value storage 502 which in turn equals temperature 105. Simultaneously, power is directionally supplied to motor 517 and to output 530 which drives valve 204 and changes the steam flow in a direction from 101 toward 103.

At step 2b, the maximum output timer box 514 limits the total change by stopping line power to the output motor 517; the steam flow is now at the setting indicated at 103.

For step 2c, power was applied to the ratio time repeat relay 518 during the time of the steam flow change signal. The voltage to D.C. motor 534 is modified by the manual setting of the slope control 520 so that a shaft rotation is obtained on cam shaft 536 proportional to output time and manually set slope. Proportionally, this is the differential increment between temperatures 105 and 107.

Step 3 adds this just obtained increment to the current value to obtain a predicted value storage for the new steam flow giving expected operating point 106.

At step 4, if a reversing signal was stored, it is applied to relay 528.

On step 5 the tank temperature is allowed to stabilize and the resulting true operating point is indicated at 108. The controller now recognized that its change was in the right direction but since the actual temperature is considerably greater than the predicted temperature, it repeats the full cycle making a maximum change once again. Again the actual temperature is greater than the predicted temperature so that another full step is made; this time the predicted temperature is greater so that the reversing storage and action occur at steps 1 and 4 and the predicted temperature lowers from point 110 to point 112 for the next cycle.

As the controller converges on the operating slope, the predicted value storage and output action of step 2a will oscillate through the null voltage range of relay 526 until the next step is made but the net change in steam flow will be progressively smaller for each successive cycle as the desired operating slope is approached.

From the foregoing, it will be recognized that the various operations of the controller and the parts which perform them may be defined in terms of circuits. That is, the current value of the process being controlled is determined by a measuring circuit which includes the variable resistor 502, its power supply, the center tap and the means which controls the position of the center tap and responds to and measures the output of the process. The predicted value of the process output resulting from a change in input may be considered to be derived from a predicting circuit which includes the variable resistor 504. The predicting circuit also includes the motor contained within the repeat servo 410, the motor 540 and the switch which is manually preset and contained within the slope direction box 522, the phase sensitive rectifier, the variable resistor 520, and the motors 534 and 538 of the ratio time repeat relay. These elements cooperate first to change the value of the resistor 504 to equal that of the resistor 502 and then add to that value the product of the slope stored at the resistor 520 and the change in input as determined by the drive means.

The portion of the mechanism which is sensitive to the difference of the values of the signals stored at the resistors 502 and 504 may aptly be termed a comparator circuit. The relay 526 and the switch controlled by it along with the manually operated switch 505 which is preset to indicate whether the optimum operating region of the process is in the region of an apparent maximum or minimum on the process curve all form part of the comparator circuit. The switch operated by the relay 526 and the switch 505 in turn control a hold circuit which stores the reversing signal. The hold circuit includes the relay and switches within the box 508, the relay 528, and the switches contained within the box 512 and which control the direction in which the drive motor 516 turns. The operation of these circuits and the manner in which they function in the controller have been described in detail above.

The timer 544 as suggested above, provides the timed periods for the stepping of rotary relay 548 during steps 1, 2, 3 and 4, and is identical to timers 515 and 546. Each time the contacts 544a of the timer 544 are closed, the coil of rotary relay 548 is energized and causes contacts 548a and 548b to rotate one step. Simultaneously, the normally closed contacts 548c are opened and break the power supply to the timer 544. The opening of contacts 548c causes the timer 544 to reset automatically. When it has reset, contacts 544a open, deenergizing the coil of relay 548 and allowing contacts 548c to close and start another timing cycle. When the contacts 548a and 548b come to the fifth step, current passes through contacts 548a and drives the timer 546. The timer 546 delays further operation of the controller until the process has stabilized. When the timer 546 closes its contacts 546a after the stabilization time, the rotary relay 548 is energized and returns to step 1.

It is understood that the circuit diagram of Fig. 5 is not the only or necessarily the most desirable mechanization of the block diagram of Fig. 4. For example, the arrangement could be completely mechanically mechanized or could be mechanized with non-linear static components such as rectifiers and saturable reactors. The relay and motor mechanization is shown for its simplicity in explanation and understanding. The ratio-time-repeat relay is here shown and described as a mechanism with a time base-line; however the entire function of the ratio-time-repeat relay, the slope adjustment and the slope adjustment control could be replaced mechanically with a ball-disc integrator and an angular repeat memory mechanism. This combination would take the angular rotation at motor shaft 530 and apply, at a later time, an angular rotation to differential 542.

Fig. 6 shows the action of the optimal controller of this invention in controlling on a required slope on the side of a maximum type curve when the controller is started from the opposite side. The arrows indicate the progress of the controller action in the same manner as was used in the explanation of Fig. 1.

Fig. 7 shows the action of the controller when controlling for a maximum. This is a problem of zero slope, therefore the predicted value is the same as the current value. The first predicted value applied was in the wrong direction from the starting point. After the first maximum was attained the operation curve changed to one with a lower maximum and this was then obtained.

It is noted that maximum and minimum control are only special cases of the general problem of slope control, the case of zero slope. Since the controller of this invention is sensitive to whether it is near a maximum or a minimum, it follows that for zero slope settings, it will hold a maximum or a minimum.

The optimal control system which is the subject of this invention differs from and thus has the advantage over previous non-linear control systems of this nature in that it will converge to and hold the required optimal control point with a minimum of searching and a minimum of process upset. It does this by virtue of knowing where the process is going to be after the next cycle rather than where it was after the last cycle. Thus if the process is where it belongs, the controller has no reason to change it. If some outside influence disturbs the process, the controller will immediately converge to the new control point.

For cubic equation type control curves where there are two areas of equal slope the choice can be made as to which area should be used for control since one will be near an apparent maximum, the other near an apparent minimum.

The adjustments of the controller must be set to match the conditions and requirements of the process. These include the time response of the process and the control of the maximum input change so that there will be no gross process upset such as wild hunting about the optimal point.

It is noted that controllers which operate by a continuous change of the input will automatically cause hunting over a wide range in any process which has an inherent time delay. This is because the controller is changing continuously during the time delay and if a reversal is called for it must run continuously in the opposite direction for twice the delay time before the process is back to its starting point. The hunting will thus be proportional to the delay time.

The controller of this invention, when properly adjusted, will approach the control point in accordance with the mathematical expression "critical damping." It can be adjusted to any percentage of "critical" desired.

It is understood that control on the slope of a curve implies control at those values of the parameters of the curve which are indicated by the point of tangency of the desired slope to the process curve.

It is further understood that the generic term "process" may be used to cover all types of mechanical, electrical or chemical systems or processes to which a controller of the type herein described may find application.

Having thus described the invention, listed its advantages and illustrated its applications, I claim:

1. Apparatus for automatically controlling a steam supplied heating process having a point of optimum operation comprising means including a first variable resistor and a manually operated switch for storing a value equivalent to the absolute value of the slope and the sign of the slope of the point of optimum operation on a process curve which gives the instantaneous relation between steam flow and output temperature; means including a second variable resistor for converting the temperature output quantity of the process to an analog equivalent; drive means including a direction sense reversing control for increasing and decreasing in discrete amounts the input steam flow to the process; manually preset means including a switch forming part of the drive means for limiting the increases and decreases in steam flow to a preselected maximum amount; means including a third variable resistor for storing a predicted temperature output for the change in input steam flow, such predicted temperature being stored as an analog quantity equivalent in scale to the analog of the temperature output; a comparator including a polarized relay electrically connected to the second and third variable resistors for comparing the temperature output analog and the stored predicted temperature analog; a hold circuit controlled by the comparator and connected thereto for storing a reversing signal when the point of optimum operation is in the region of an apparent maximum on the process curve and the output temperature analog is less than the stored predicted temperature analog, and also for storing a reversing signal when the point of optimum operation is in the region of an apparent minimum on the process curve and the temperature output analog is more than the stored predicted temperature analog; said reversing signal reversing the direction sense reversing control after the next operation of the drive means following the operation of the comparator; means for applying said reversing signal to said drive means; means mechanically connected to the second variable resistor for changing the stored analog of the predicted value of output temperature to equal the analog of the current value of output temperature after the operation of the comparator, said last recited means being further connected to said drive means for simultaneously actuating the latter to change the steam flow an amount proportional to the difference between the analogs; a predicting circuit including the first variable resistor and a phase sensitive rectifier operating simultaneously with the change in steam flow for computing and storing a differential analog quantity proportional to the product of the change in steam flow and the stored value of the slope; means mechanically connected to the second variable resistor and electrically connected intermediate the input of said drive means and said means for storing a predicted temperature output for subsequently adding the value of the stored differential analog to the changed analog of the predicted value, the total analog resulting from the addition representing a new predicted value; means including a timer for delaying the next operation of the comparator until the output temperature has stabilized following the last operation of the drive means; said last recited means being connected to the input of said drive means; and a programmer including a second timer for controlling the time sequence of the parts comprising the apparatus in constantly repeating order.

2. Apparatus for controlling a process having an optimum operating region and in which the process output quantity is dependent on an input quantity to the process comprising drive means for changing the input quantity in discrete amounts; means for producing a first signal which is a function of the output quantity of the process; a predicting circuit responsive to operation of the drive means for predicting what the value of the output quantity would be as a result of the discrete change in input quantity if the process were operating in the optimum operating region, said predicting circuit producing and storing a second signal which is a function of the predicted output quantity; a comparator including a relay operated switch for comparing the first and second signals; a manually operated switch preset to indicate whether the optimum operating region is in the region of an apparent maximum or minimum on a process curve which gives the instantaneous relation between the input and output quantities, a hold circuit connected to the comparator through the relay operated switch and the preset switch for storing a reversing signal when the switches close the circuit between the hold circuit and the comparator; additional means including the drive means for changing the input quantity again a discrete amount proportional to the difference of the first and second signals; and means responsive to the stored reversing signal for reversing the direction of the discrete amount of change in input quantity after the next change in output quantity.

3. Apparatus for controlling a process having an optimum operating region and in which the process output quantity is dependent on an input quantity to the process comprising drive means for changing the input quantity in discrete amounts; means for producing a first signal which is a measure of process output quantity after the input quantity has changed; a predicting circuit responsive to the change in input quantity for predicting the value of the output quantity of the process resulting from the change in input quantity, said predicting circuit storing a second signal proportional to the predicted quantity; and comparing means connected intermediate said predicting circuit and said first signal producing means and operating through said drive means for changing the input quantity again an amount which is a function of the difference of the values of the first and second signals causing the operation of the process to move closer to the optimum operating region.

4. Apparatus as defined in claim 3 further characterized by said comparing means changing the input quantity an amount proportional to the difference of the values of the first and second signals; and manually operable means connected to said drive means for limiting the discrete changes in the input quantity to a preselected maximum amount.

5. Apparatus as defined in claim 3 further characterized by means including a timer connected to said drive means preventing changes in the input quantity until after the output quantity has stabilized after the next preceding operation of the drive means.

6. Apparatus as defined in claim 3 further characterized by a programmer controlling the time sequence of operation of all of the means in constantly repeating order.

7. Apparatus for controlling a process having an optimum operating region and in which the process output quantity is dependent upon an input quantity to the process comprising drive means including a motor for changing in discrete steps the input quantity to the process; a measuring circuit including a variable resistor for producing a first signal which is a function of the output quantity of the process; a predicting circuit connected to the measuring circuit and the drive means for predicting the new value of the output quantity of the process as a result of the discrete change in input quantity, said predicting circuit including a second variable resistor for storing a second signal which is a function of the predicted value; a comparator circuit including a relay connected to the variable resistors and sensitive to the difference in the first and second signals; a pair of switches forming part of the comparator circuit, one of said switches operated by the relay and the second switch manually operated and preset to indicate a characteristic of the optimum operation region of the process; a hold circuit controlled by the comparator circuit and electrically connected thereto by the two switches and storing a reversing signal when the two switches close the hold circuit; additional means including the drive means for change the input quantity again a discrete amount proportional to the difference of the first and second signals, means for applying said reversing signal to said additional means, said additional means reversing the direction of change of the input quantity in response to said applied reversing signal.

8. A controller for controlling a process at an optimum point on a process curve which is a plot of input quantity against output quantity comprising means for converting the current output quantity value to an analog equivalent, means for storing a predicted output quantity value in analog form, a comparator for comparing said output and predicted values, means controlled by said comparator for storing a reversing signal when the point of optimum operation is in the region of an apparent maximum or minimum on said process curve and said output quantity and predicted values respectively are on opposite sides of said process curve, means controlled by said comparator for changing said stored predicted value to said current output quantity value, governing means controlled by said last recited means and by said reversing signal for changing said input quantity in discrete amounts, a predicting circuit connected intermediate the input of said governing means and of said predicted output quantity storage means for computing a differential analog quantity proportional to the product of the change of said input quantity and the slope of said process curve at said optimum point, and means for delaying successive operations of said comparator pending the stabilization of said output quantity as a result of the last change of said input quantity.

9. Apparatus for controlling a process having an optimum operating region and in which the process output quantity is dependent on an input quantity to the process comprising drive means for changing the input quantity in discrete amounts; means for producing a first signal which is a function of the output quantity of the process; a predicting circuit responsive to operation of the drive means and responsive to the first signal for predicting what the value of the output quantity would be as a result of the discrete change in input quantity if the process were operating in the optimum operating region, said predicting circuit producing and storing a second signal which is a function of the predicted output quantity; a comparator for comparing said first and second signals, the difference between said first and second signal being an error signal having both magnitude and direction; said comparator including a first switch responsive to the direction of the error signal and a manually operated switch preset to indicate whether the optimum operating region is in the region of an apparent maximum or apparent minimum on the process curve which gives the instantaneous relation between the input and output quantities; a hold circuit connected to the manually operated switch through the first switch for storing a reversing signal when there is continuity in the circuit containing the two switches; additional means including the drive means for changing the input quantity again a discrete amount proportional to the magnitude of the error signals; means responsive to the stored reversing signal for reversing the direction of discrete changes in input quantity for all changes following the change just made in the input quantity; and a programmer controlling the time sequence of operation of all of the parts of the apparatus in constantly repeating order.

10. Apparatus as defined in claim 9 further characterized by means for limiting the magnitude of the discrete changes in input quantity caused by the drive means to a manually adjustable preselected maximum.

11. Apparatus as defined in claim 9 further characterized by means including a timer connected to the programmer for preventing changes in the input quantity until after the expiration of a preselected period following the next preceding change of the input quantity; said period allowing the output of the process to stabilize from said next preceding change.

12. Apparatus for controlling a process having an optimum operating region and in which the process output quantity is dependent on an input quantity to the process comprising drive means for changing the input quantity in discrete amounts; means for producing a first signal which is a measure of process output quantity after the input quantity has changed; a predicting circuit responsive to the operation of the drive means and to the requirements of optimum operation for predicting the value of the output quantity of the process resulting from the change in input quantity under optimum conditions, said predicting circuit storing a second signal proportional to the predicted quantity; comparing means electrically connected to the predicting circuit and the first signal producing means for comparing said first and second signals and producing an error signal, said error signal being equal to the difference between said first and second signal, and means responsive to the error signal and controlling the drive means causing the drive means to change the input quantity of the process in a direction so that the process moves closer to the optimum operating region.

13. Apparatus as defined in claim 12 further characterized by the last-named means controlling the drive means causing the changes in input quantity to be proportional to the magnitude of the error signal.

14. Apparatus as defined in claim 12 further characterized by a programmer controlling the time sequence of operation of all of the means in constantly repeating order.

15. Apparatus as defined in claim 14 further characterized by means including a timer connected to said programmer preventing changes in the input quantity for a predetermined period after the next preceding change of the input quantity.

16. Apparatus for controlling a process having an optimum operating region and in which the process output quantity is dependent on an input quantity to the process comprising drive means for changing the input quantity in discrete amounts, predicting means for predicting the value of the output of the process as a result of a change in input as if the functional relationship between input and output of the process was that at the optimum operating region, means for measuring the actual value of the output as a result of a change in input, means operatively associated with the predicting means and the measuring means for comparing the predicted and actual values of the output, and means responsive to the comparing means and controlling the drive means causing the drive means to change the input quantity of the process a discrete amount proportional to the difference between the predicted and actual values of the output.

References Cited in the file of this patent

UNITED STATES PATENTS

| | | |
|---|---|---|
| 2,488,221 | Moore | Nov. 15, 1949 |
| 2,509,295 | Glass | May 30, 1950 |
| 2,547,750 | Hall | Apr. 3, 1951 |
| 2,666,584 | Kliever | Jan. 19, 1954 |
| 2,842,108 | Sanders | July 8, 1958 |

FOREIGN PATENTS

| | | |
|---|---|---|
| 444,673 | Great Britain | Mar. 25, 1936 |